(12) United States Patent
Turcato et al.

(10) Patent No.: US 12,066,281 B2
(45) Date of Patent: Aug. 20, 2024

(54) SYSTEM AND METHOD FOR DETERMINING RADIUS OF A WHEEL OF A MOBILE MACHINE

(71) Applicant: AGCO International GmbH, Neuhausen (CH)

(72) Inventors: Paolo Turcato, Breganze (IT); Filippo Carollo, Breganze (IT); Andrea Dal Soglio, Breganze (IT)

(73) Assignee: AGCO International GmbH, Neuhausen (CH)

( * ) Notice: Subject to any disclaimer, the term of this patent is extended or adjusted under 35 U.S.C. 154(b) by 36 days.

(21) Appl. No.: 17/810,170

(22) Filed: Jun. 30, 2022

(65) Prior Publication Data

US 2023/0009379 A1   Jan. 12, 2023

(30) Foreign Application Priority Data

Jul. 7, 2021 (GB) ...................................... 2109792

(51) Int. Cl.
| | |
|---|---|
| *G01B 11/08* | (2006.01) |
| *G01B 11/02* | (2006.01) |
| *G01B 17/00* | (2006.01) |
| *G01B 11/06* | (2006.01) |

(52) U.S. Cl.
CPC ............ *G01B 11/08* (2013.01); *G01B 11/026* (2013.01); *G01B 17/00* (2013.01); *G01B 11/0608* (2013.01)

(58) Field of Classification Search
CPC ... G01B 11/08; G01B 11/026; G01B 11/0608; G01B 17/00
See application file for complete search history.

(56) References Cited

U.S. PATENT DOCUMENTS

| | | | | |
|---|---|---|---|---|
| 6,237,234 | B1* | 5/2001 | Jackson | G01B 11/08 33/555.1 |
| 10,216,156 | B2* | 2/2019 | Enns | G05B 15/02 |
| 10,485,174 | B2* | 11/2019 | Fay, II | B60G 21/073 |
| 2011/0099962 | A1 | 5/2011 | Coers et al. | |
| 2018/0070531 | A1 | 3/2018 | Long et al. | |
| 2019/0315183 | A1* | 10/2019 | Ducroquet | B60B 35/02 |

FOREIGN PATENT DOCUMENTS

| | | | | |
|---|---|---|---|---|
| CN | 204462853 U | | 7/2015 | |
| DE | 102009026845 A1 * | | 12/2010 | .......... G01M 17/027 |
| DE | 102012215256 A1 * | | 3/2014 | .............. B61K 9/12 |
| DE | 102019214815 B3 | | 3/2021 | |

OTHER PUBLICATIONS

UK Intellectual Property Office, Search Report for UK Priority Application No. GB2109792.8, dated Nov. 4, 2021.

\* cited by examiner

*Primary Examiner* — Jill E Culler (57) ABSTRACT

A distance sensor is used for automatically determining the size of a wheel on a mobile machine. The distance sensor is mounted to detect distance information relating to a distance between the sensor and an outer circumferential surface of the wheel. The distance information is received by a controller configured to determine the radius of the wheel based at least in part on the distance information. The controller may compare the measured radius with data for a range of standard wheel sizes and determine which standard wheel size is fitted. The measured wheel radius and/or the determined standard wheel size can used as an input for a control system on the machine which requires wheel size data, such as an axle height adjustment system.

15 Claims, 4 Drawing Sheets

SYSTEM AND METHOD FOR DETERMINING RADIUS OF A WHEEL OF A MOBILE MACHINE

CROSS-REFERENCE TO RELATED APPLICATION

This application claims the benefit of the filing date of U.K. Patent Application 2109792.8, "Mobile Machine and Method," filed Jul. 7, 2021, the entire disclosure of which is incorporated herein by reference.

FIELD

The present disclosure is concerned with systems and methods for automatically determining the size of a wheel on a mobile machine, especially a mobile agricultural machine or similar off-road vehicle.

BACKGROUND

It is known to provide a combine harvester (herein also referred to simply as a harvester) with systems to vary the height of an axle. One such arrangement is a body levelling system, which maintains the body of the harvester level when working on a slope. Such a system is disclosed in U.S. Pat. No. 11,110,771 "Wheel Axle for a Combine Harvester," granted Sep. 7, 2021, and is operative to vary the height of the body relative to an axle. Vehicles driving on public roads may be subject to a limit on total height. For example, a height limit of 4 meters is currently applied in the European Union. To ensure that a harvester can meet this requirement when travelling on a road, it is known to use a body levelling or other axle height adjustment system to lower the axle height so that the total height of the vehicle does not exceed the limit. However, correct positioning of the axle is dependent on wheel size to ensure that body does not contact the wheels. Harvesters can be fitted with wheels of different sizes as an option. To cater for this, the known axle height adjustment systems require an operator to enter or select the size of wheel fitted to the axle in question. The system will then apply different offsets (or no offset) for axle height adjustment depending on the wheel size data entered or selected. These arrangements work satisfactorily but are subject to the correct wheel size data being entered or selected. In the event that incorrect wheel size data is entered or selected, this could give rise to a potentially dangerous situation.

Other mobile machines have safety critical systems that rely on correct wheel size data and are subject to the same concerns.

BRIEF SUMMARY

Embodiments of the disclosure relate to mobile machine having a system for determining the radius of a wheel of the mobile machine and to a method of determining the radius of a wheel of the mobile machine.

In some embodiments, a system comprises a distance sensor mounted to the mobile machine and at least one controller. The distance sensor is configured to detect distance information relating to a distance between the sensor (or another known datum) and an outer circumferential surface region the wheel. The at least one controller is configured to receive the distance information from the distance sensor and to determine the radius of the wheel based at least in part on the distance information.

The automated system for determining the radius of a wheel of the mobile machine can be used to provide data relating to the determined wheel radius for use in one or more control systems of the mobile machine which require wheel size data for correct operation. Data relating to radius of a wheel obtained using the method can be used as an input for one or more control systems of the mobile machine which require wheel size data for correct operation. Alternatively, the measured wheel radius can be used to determine which of a range of standard wheel sizes the wheel conforms to and the determined standard wheel size, or data relating thereto, used as an input. This improves safety of the mobile machine by reducing the risk of incorrect wheel size data being used by such systems.

It will be appreciated that references herein to determining or measuring a radius of a wheel are intended to include determining or measuring the diameter of a wheel or indeed any other directly related dimension of the wheel.

In an embodiment, the distance sensor is an ultrasonic or a laser sensor.

In an embodiment, the system is configured to determine distance information between the sensor and the wheel to a precision of ±2 mm or better, or to a precision of ±1 mm or better.

The distance sensor may be mounted to a body or other structural component of the mobile machine at a known distance from the wheel. The distance sensor may be mounted to a body or other structural component of the mobile machine at a known distance from an axis of rotation of the wheel. The distance sensor may be mounted to a body or other structural component of the mobile machine at a location which is at a fixed, or at least a known, distance from the wheel.

In an embodiment, the wheel has a tire, and the outer circumferential surface region of the wheel is defined by an outer circumferential surface region of the tire. In an embodiment, the outer circumferential surface of the tire defines a tread comprising a plurality of tread features arranged in a pattern and separated by grooves, and the system is configured to determine the distance between the sensor and the outer circumferential surface of the tire in at least one of the following two measurement modes: an absolute mode in which a minimum distance ($D_{min}$) between the sensor and the tire is measured at outer surfaces of the tread features; and a relative mode in which differences between the minimum distance ($D_{min}$) between the sensor and the tire measured at outer surfaces of the tread features and a maximum distance ($D_{max}$) measured at a bottom of the grooves as the wheel rotates is used to determine the depth of the tread (TD).

In such an embodiment, the at least one controller may also be configured to use the distance information to monitor wear of the tire. The at least one controller may be configured to record initial values for the minimum distance ($D_{min}$) and/or thread depth (TD) and to record data relating the minimum distance ($D_{min}$) and/or thread depth (TD) and/or changes thereto over time/usage. The at least one controller may be configured combine distance information from the distance sensor with information regarding ground speed of the mobile machine obtained from a ground speed sensor and/or data regarding elapsed operating time for an engine of the mobile machine to map wear of the tire in relation to usage of the mobile machine.

In an embodiment, the system is configured to determine the radius of the wheel using the absolute mode.

The at least one controller may be configured to determine from the measured wheel radius which one of a range of standard wheel sizes the wheel conforms to. The at least one controller may be configured to compare the measured wheel radius with data relating to a range of standard wheel sizes stored in a lookup table. Wheel data relating to a range of standard wheels sizes may be stored in a memory accessible to the controller.

The mobile machine may have at least one further control system which requires data relating to wheel size, the mobile machine being configured such that data regarding wheel radius and/or the determined standard wheel size is used as an input to the further system. The further control system may be a system arranged to adjust the height of an axle to which the wheel is fitted and may be a body levelling system.

The system for determining the radius of a wheel of the mobile machine may be operative in respect of more than one wheel of the mobile machine, the system having a respective distance sensor for each wheel to be measured, each sensor providing respective distance information relating to a distance between the sensor (or another known datum) and an outer circumferential surface region of the respective wheel to the at least one controller.

The mobile machine may be a mobile agricultural machine and may be a combine harvester.

In an embodiment, a method of determining the radius of a wheel on a mobile machine comprises using a distance sensor mounted to the mobile machine to provide information relating to a distance between the sensor (or another known datum) and an outer circumferential surface region of the wheel and determining the radius of the wheel from the distance information.

Data relating to the determined wheel radius can be used in one or more control systems of the mobile machine which require wheel size data for correct operation. This improves safety of the mobile machine by reducing the risk of incorrect wheel size data being used by such systems.

Advantageously, the method may comprise providing the distance information from the distance sensor to one or more electronic controllers and using the one or more controllers to determine the radius of the wheel based at least in part on the distance information.

The method may comprise mounting the sensor to a body or other structural component of the mobile machine at a known distance from the wheel. The method may comprise mounting the sensor to a body or other structural component of the mobile machine at a known distance from an axis of rotation of the wheel. The method may comprise mounting the sensor to a body or other structural component of the mobile machine at a location which is at a fixed, or at least a known, distance from the wheel.

The method may comprise using the determined radius data as an input to at least one further control system of the mobile machine. The at least one further control system may be a control system which requires data relating to wheel radius and may be a safety critical control system. The further control system may be a system arranged to adjust the height of an axle to which the wheel is fitted and may be a body levelling system.

Alternatively, the method may comprise determining from the measured wheel radius which one of a range of standard wheel sizes the wheel conforms to. The method may comprise comparing the measured wheel radius with data relating to a range of standard wheel sizes stored in a lookup table. The method may comprise storing wheel size data relating to a range of standard wheels sizes in a memory accessible to the controller.

The method for determining the radius of a wheel of the mobile machine may be extended to more than wheel of the mobile machine by using a respective distance sensor mounted to the mobile machine for each wheel to be monitored, each sensor providing respective distance information relating to the distance between the sensor (or another known datum) and an outer circumferential surface region of the respective wheel.

In an embodiment, the wheel has a tire, and the outer circumferential surface of the wheel is defined by an outer circumferential surface of the tire. In an embodiment, the outer circumferential surface of the tire defines a tread comprising a plurality of tread features arranged in a pattern and separated by grooves, and the method may comprise determining the distance between the sensor and the outer circumferential surface of the tire in at least one of the following two measurement modes: an absolute mode in which a minimum distance ($D_{min}$) between the sensor and the tire is measured at the outer surfaces of the tread features; and a relative mode in which differences between the minimum distance ($D_{min}$) between the sensor and the tire measured at the outer surfaces of the tread features and a maximum distance ($D_{max}$) measured at the bottom of the grooves as the wheel rotates is used to determine the depth of the tread (TD).

If the wheel has a tire, the method may comprise monitoring changes in the distance information provided by the distance sensor over time/usage to determine wear of the tire. The method may comprise providing the distance information from the distance sensor to one or more controllers and using the one or more controllers to monitor wear of the tire based at least in part on the distance information. The method may comprise recording initial values for the minimum distance ($D_{min}$) and/or thread depth (TD) and recording data relating to the minimum distance ($D_{min}$) and/or thread depth (TD) and/or changes thereto over time/usage. The method may comprise providing an output regarding tire wear and/or an indication of the need to replace a tire when the minimum distance ($D_{min}$) and/or thread depth (TD) reach a predetermined value or values. The method may comprise mapping wear over a lifecycle of a tire. The method may comprise calibrating the system when a tire is fitted. The method may comprise recording initial values of the minimum distance ($D_{min}$) and/or thread depth (TD) for a tire when newly fitted to the mobile machine. In an embodiment, the method comprises combining the distance information from the distance sensor with information relating to ground speed of the mobile machine and/or with information relating to use of an engine of the mobile machine (e.g., elapsed engine hours) to log and/or map wear of the tire relative to usage of the mobile machine.

In a further aspect, computer software comprises computer readable instructions which, when executed by one or more processors, causes performance of the method(s) as outline above.

A further aspect includes a computer readable storage medium comprising the computer software of the preceding aspect. Optionally, the storage medium comprises a non-transitory computer readable storage medium.

BRIEF DESCRIPTION OF THE DRAWINGS

While the specification concludes with claims particularly pointing out and distinctly claiming what are regarded as embodiments of the present disclosure, various features and advantages may be more readily ascertained from the following description of example embodiments when read in conjunction with the accompanying drawings, in which:

DETAILED DESCRIPTION

The illustrations presented herein are not actual views of any combine harvester or portion thereof, but are merely idealized representations to describe example embodiments of the present disclosure. Additionally, elements common between figures may retain the same numerical designation.

The following description provides specific details of embodiments. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all the elements that form a complete structure or assembly. Only those process acts and structures necessary to understand the embodiments of the disclosure are described in detail below. Additional conventional acts and structures may be used. The drawings accompanying the application are for illustrative purposes only, and are thus not drawn to scale.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other, compatible materials, structures, features, and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures.

As used herein, ranges are used as shorthand for describing each and every value that is within the range. Any value within the range can be selected as the terminus of the range.

Certain embodiments of a mobile machine having a system for determining the radius of a wheel and methods of determining the radius of a wheel on a mobile machine are disclosed that use electronic functions to enable the automatic measuring of wheel size. In various embodiments described herein, a harvester is illustrative of an example of a mobile machine. However, the wheel radius determination systems and methods can be adapted for use with other mobile machines, including, without limitation, self-propelled mobile machines such as tractors, mobile cranes, excavators, and the like. The wheel radius determination systems and methods can be adapted for use with any suitable mobile machine or vehicle.

Figure 1:
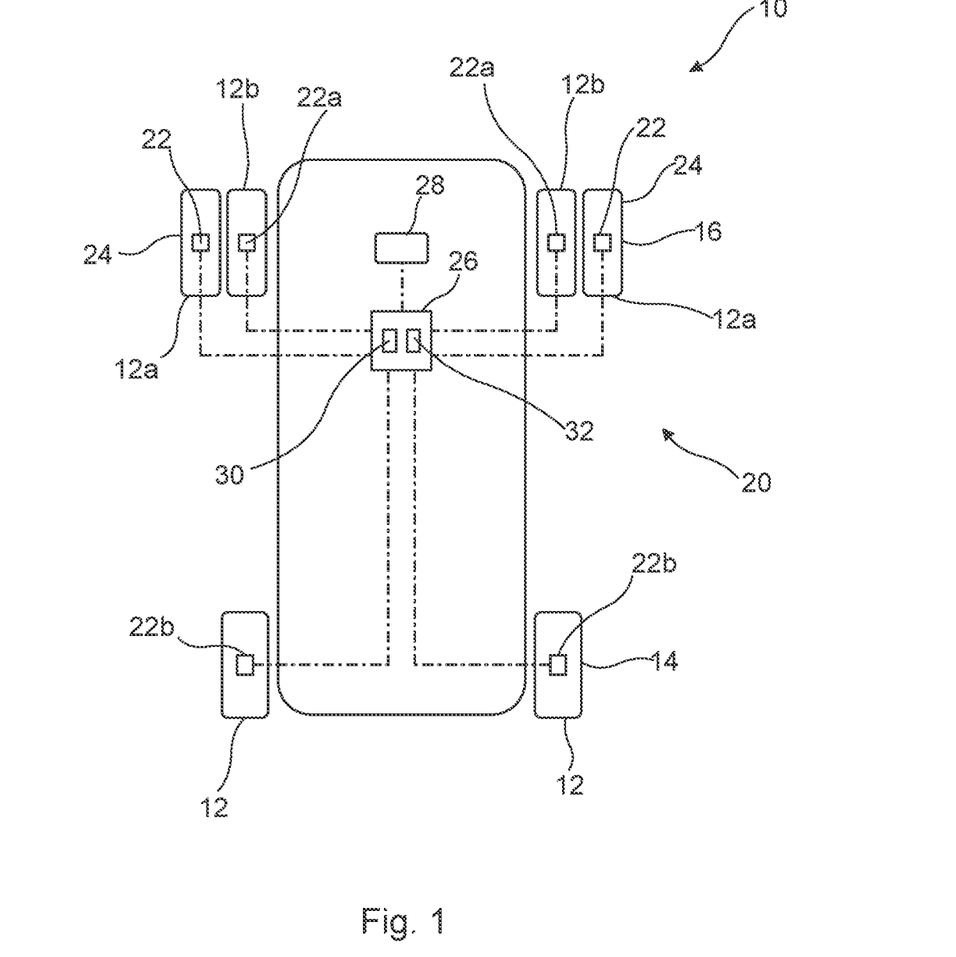
FIG. 1 is a schematic plan view of an embodiment of a combine harvester incorporating a system for automatically determining the radius of a wheel of the harvester.

As illustrated schematically in FIG. 1, a harvester 10 has single wheels 12 on a rear axle 14. The front axle 16 has dual wheels, with a dual-wheel assembly comprising an outer wheel 12a and an inner wheel 12b on either side.

It should be noted that references hereinafter made to certain directions, such as, for example, "front", "rear", "left" and "right", are made as viewed from the rear of a harvester looking forward.

FIG. 1 illustrates schematically an embodiment of system 20 for measuring and/or determining the radius of the various wheels 12 of a harvester 10. It should be appreciated that the wheel radius measuring system 20 in FIG. 1 is merely an illustrative of example and that some embodiments may include different features (e.g., additional or fewer features).

The wheel radius measuring system 20 comprises distance sensors 22 mounted on the harvester at a known locations relative to each of the wheels 12 which are to be measured. Each distance sensor 22 is positioned to detect a distance between the sensor (i.e., a known datum fixed relative to the sensor) and an outer circumferential region of the respective wheel 12. The wheels 12 in this case are fitted with pneumatic tires 24 which define a tread 24a (FIG. 2), and the system measures the radius of each wheel at an outer circumferential region of the tire 24. The system 20 also comprises an electronic controller or electronic control unit (ECU) 26 and a human-machine interface (HMI) 28, which 28 includes a display screen visible to an operator of the machine and user input means. The display screen may be a touch screen through which the operator is able to provide inputs and/or other user input means may be provided which could be physically separate from the display screen. Note that there may be additional components in some embodiments, including one or more controllers that cooperate to enable functionality of the wheel radius monitoring system 20 and/or additional sensors, or fewer components.

The distance sensors 22 each provide an input signal to the ECU 26 indicative of a detected distance between the sensor and the outer circumferential surface of the tire 24 of its respective wheel. Electronic communications among the various components of the system 20 may be achieved over a controller area network (CAN) bus or via a communications medium using other standard or proprietary communication protocols (e.g., RS 232, etc.). Communication may be achieved over a wired medium, wireless medium, or a combination of wired and wireless media.

The ECU 26 provides the control logic for wheel measuring functionality. The ECU 26 may be part of a general control system for the machine.

In one embodiment, the ECU 26 comprises one or more processors, such as processor 30, input/output (I/O) interface(s) (in this embodiment the HMI 28), and memory 32, all coupled to one or more data buses. The memory 32 may include any one or a combination of volatile memory elements (e.g., random-access memory RAM, such as DRAM, and SRAM, etc.) and non-volatile memory elements (e.g., ROM, hard drive, tape, CDROM, etc.). The memory 32 may store a native operating system, one or more native applications, emulation systems, or emulated applications for any of a variety of operating systems and/or emulated hardware platforms, emulated operating systems, etc. In one embodiment, the memory comprises an operating system and wheel radius determining software. In some embodiments, additional or fewer software modules (e.g., combined functionality) may be stored in the memory 32 or additional memory. In some embodiments, a separate storage device may be coupled to the data bus, such as a persistent memory (e.g., optical, magnetic, and/or semiconductor memory and associated drives).

The processor 30 may be embodied as a custom-made or commercially available processor, a central processing unit (CPU) or an auxiliary processor among several processors, a semiconductor based microprocessor (in the form of a microchip), a macro processor, one or more application specific integrated circuits (ASICs), a plurality of suitably configured digital logic gates, and/or other well-known electrical configurations comprising discrete elements both individually and in various combinations to coordinate the overall operation of the controller 26.

The distance sensors 22 can be of any suitable type as are well known in the art capable of detecting the distance between the sensor and the outer circumferential surface of the wheel to a suitable level of accuracy. In embodiments, the distance sensors 22 are ultrasonic or laser distance sensors. In an embodiment, the distance sensors 22 are positioned such that an axis of measurement is directed toward the outer circumferential surface of the corresponding tire 24. In an embodiment, the distance sensors 22 are configured to determine distance information between each sensor 22 and the respective tire 24 to a precision within ±2 mm, or to a precision within ±1 mm, or better.

Each distance sensor 22 is mounted to the harvester at a suitable location that is a known distance from its respective wheel 12 (e.g., a known distance from an axis of rotation of the wheel 12). In the embodiment illustrated in FIGS. 2 and 3, a distance sensor 22 for one of the outer front wheels 12a is shown mounted to a gantry 40 which runs above the front wheels. A sensor 22 for the other outer wheel and sensors 22a for the inner front wheels could also be mounted to the gantry 40. However, the sensors can be located on any suitable part of the harvester. The system 20 may optionally be extended to the rear wheels 12 by a further sensor 22b for each rear wheel 12.

Figure 2:
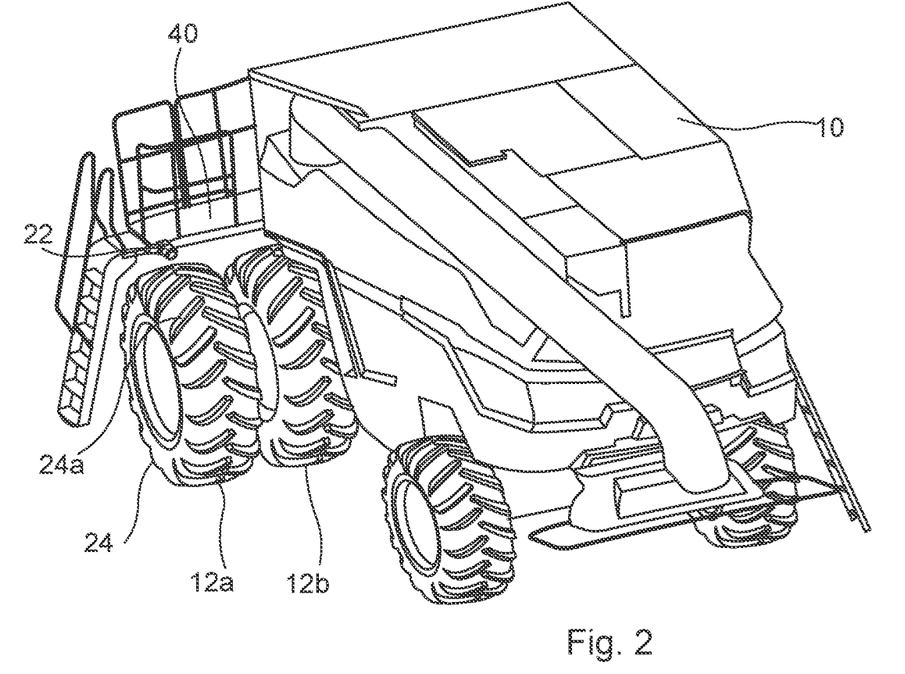
FIG. 2 is a perspective view of part of a combine harvester illustrating one possible location of a distance sensor forming part of the system of FIG. 1.
Figure 3:
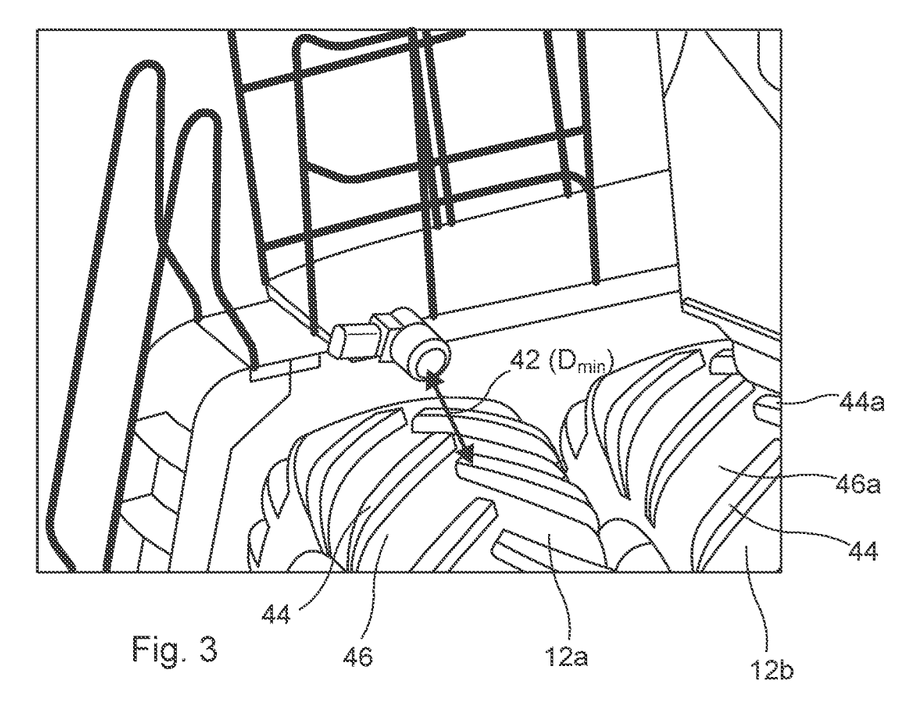
FIG. 3 is a partial view of the combine harvester of FIG. 2, illustrating operation of the distance sensor.

The outer circumferential surface 24a of each tire 24 is profiled to define a tread which includes a series of raised tread formations or lugs 44 arranged in a pattern and separated by grooves 46. This is a typical tread arrangement for tires on an agricultural mobile machine, but tread arrangements comprising other types of raised tread features, such as blocks, ribs or the like, separated by grooves are also known. For ease of reference, the term "tread feature" is used to define any raised feature of a tire tread including lugs, blocks, ribs and the like, and the term "groove" is used to define the regions between such tread features.

Figure 4:
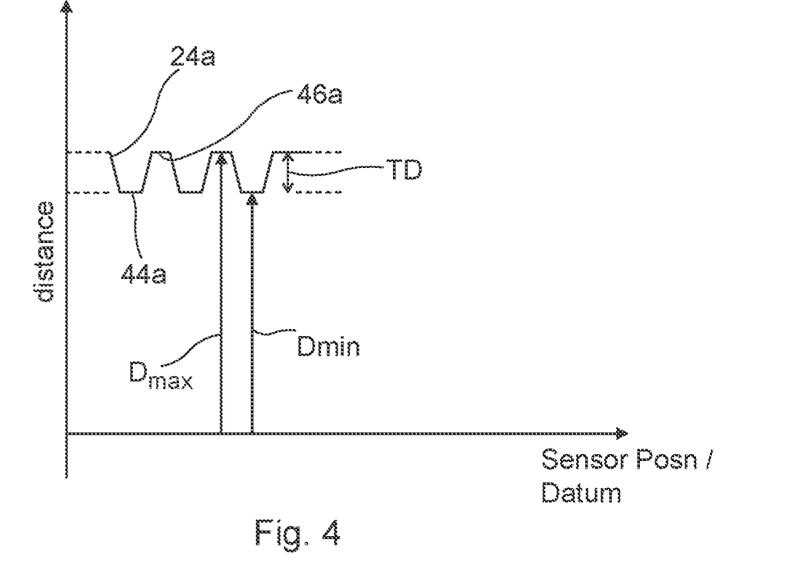
FIG. 4 is a graphic illustration of the distance information obtained by a distance sensor in the system of FIG. 1 relative to a tire tread profile.

With reference to FIG. 4, the actual distance measured between a distance sensor 22 and the outer circumferential surface 24a of a tire 24 will depend on where the measurement is taken, with a minimum distance $D_{min}$, being measured at the outer surfaces 44a of the lugs 44 and a maximum distance $D_{max}$ measured at the base 46a of the grooves 46. The wheel radius measuring system 20 is configured to carry out distance measurements to the tire in two modes: an absolute mode in which a minimum distance $D_{min}$, between the sensor and the tire is measured at the outer surfaces of the tread features; and a relative mode in which differences between a minimum distance $D_{min}$, between the sensor and the tire measured at the outer surfaces of the tread features and a maximum distance $D_{max}$ measured at the bottom of the grooves as the wheel rotates is used to determine the depth of the tread TD.

Each sensor should be aligned at a known angle relative to the outer circumferential surface 24a of its respective tire 24 which permits the tread depth TD measurement. For example, in one embodiment, each sensor 22 is aligned at 90° to a plane tangential to the outer circumferential surface 24a of the respective tire in a measurement zone or region. However, other angles are possible and the sensors can be aligned at in the range of 60° to 120°, or at an angle in the range of 80° to 100°, or in a range of 90° to 100° to that plane.

Figure 5:
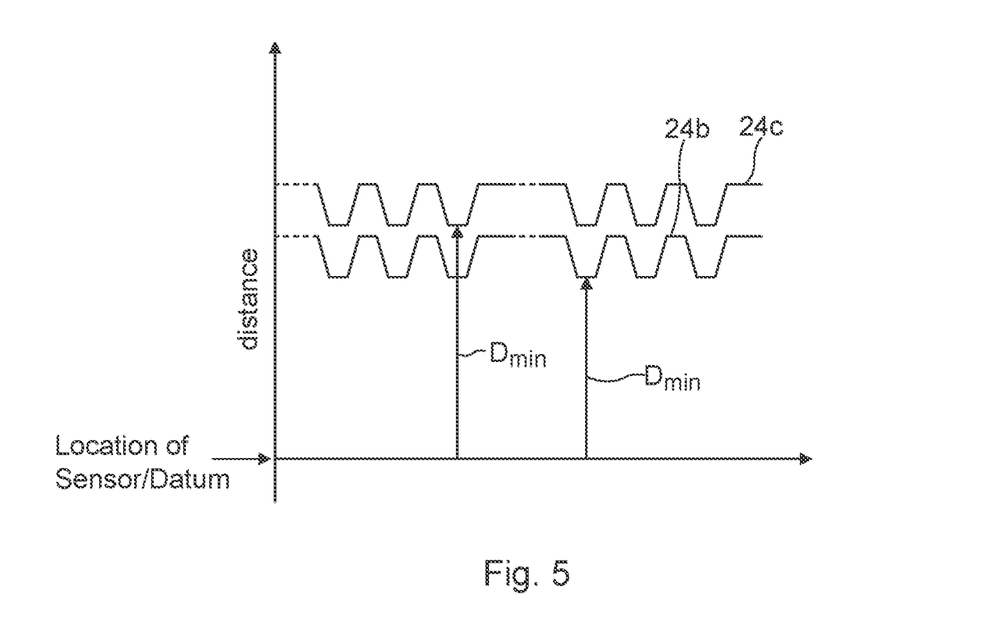
FIG. 5 is a graphic illustration similar to that of FIG. 4 but showing how distance information from the distance sensor can be used to determine the size (radius/diameter) of a wheel.

The distance between the sensor 22 and the tire 24 is indicative of the radius and diameter of the wheel. This is illustrated in FIG. 5, which shows how the distance from a sensor 22 to the outer surface 24a of the tire 24 varies between a larger wheel 24b and a smaller wheel 24c, the profile 24c of the tire for the smaller wheel being shown above the profile 24b for the larger wheel. In this embodiment, the larger wheel 24b might be an R38 size wheel and the smaller wheel an R32 size wheel. Since the position of the sensor 22 on the mobile machine is known relative to the axis of rotation of the wheel, distance information from the sensor 22 can be used to calculate the radius and diameter of the wheel. Typically the radius of the wheel 12 will be determined from the minimum distance $D_{min}$. However, data obtained in the relative mode of measurement may also be used and/or may be used to confirm correct operation of the system.

Wheel radius data, and/or other wheel size data which can be determined from the measured wheel radius, is advantageously used as an input to at least one other control system on the mobile machine which requires accurate wheel size data. Typically this may be a system that adjusts the height of an axle to which the wheel is mounted, and could be a body levelling system as discussed earlier. The wheel radius data can be provided to the other control system automatically without requiring an input from an operator. In an embodiment, the determined wheel radius may be stored to memory where it can be accessed by any control system on the harvester that requires this data. In an embodiment, rather than using the actual measured wheel radius itself as an input, the system is configured to correlate the measured wheel radius to a standard wheel size and to use the standard wheel size, or data relating thereto, as an input to the other control system. In this regard, the system may compare the measured wheel radius with data relating to a range of standard wheels to determine which standard sized wheel is fitted. Wheel size data for a range of standard wheel sizes expected to be used on the harvester can be stored in the memory, for example in a lookup table. With reference to FIG. 5, for example, in a machine that can be fitted with either R32 or R38 size wheels, the controller can determine from the measured wheel radius whether the wheel is an R32 or an R38. The controller may store determined wheel size in memory so that the data can be used as an input to another control system that requires this data. This in effect uses the system for measuring wheel radius to automatically determine the wheel size rather than have the user select the wheel size from a menu option.

The term "standard wheel size" should be understood as including commercially available wheel and tire combinations for the mobile machine.

If a harvester has a body levelling or other axle height adjustment system, data from this body levelling/axle height adjustment system may be provided to the controller 26 so that corrections for changes in the relative position of a sensor 22 and its respective wheel caused by the other system can be made when determining the wheel radius. Alternatively, the controller 26 may be configured so that wheel radius measurement is only carried out when the axle levelling/axle height adjustment system is in a known datum configuration or not active.

For the avoidance of doubt, it should be understood that references herein to a wheel should be considered to include a tire fitted to the wheel unless the context requires otherwise.

Use of a distance sensor 22 to measure the radius of a wheel can also be advantageous in providing ground speed data for the machine. Typically, ground speed is determined using a sensor in the gearbox/drive train of the machine to detect rotation of a component whose speed of rotation is fixed relative to the speed of rotation of wheels driven from the component. From this data, the ground speed is calculated or otherwise derived based on an assumed radius (and hence circumference) of the driven wheels. However, if the radius of the driven wheels is measured using a distance sensor 22, 22a, 22b as described above, the actual measured radius of the driven wheels (or the actual circumference calculated from the measured radius) can be used in place of the assumed radius (or assumed circumference) to provide more accurate ground speed data.

Figure 6:
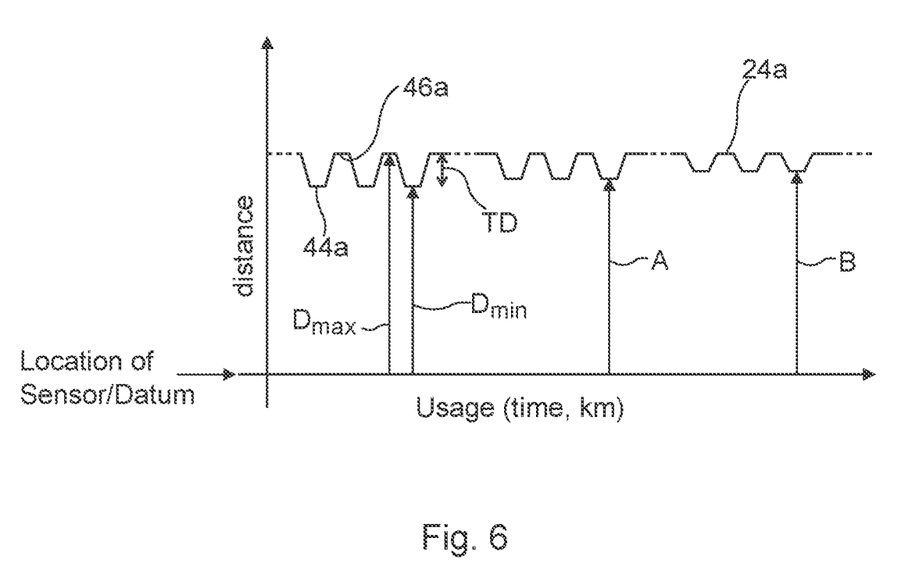
FIG. 6 is a graphic illustration similar to that of FIG. 4 but showing how distance information from the distance sensor can be used to monitor tire wear.

As a tire wears, the radius of the wheel will reduce. FIG. 6 illustrates changes in a typical tread profile as a tire wears over time, with the minimum distance $D_{min}$, increasing and the tread depth TD ($D_{max}-D_{min}$) decreasing. As the tire wears, the system 20 is able to detect changes in the wheel radius so that ground speed data accuracy is maintained.

If the system determines which of a range of standard wheel sizes is actually fitted, data relating to the dimensions of the standard wheel size may be used instead of the actual measured radius for calculating ground speed. This ensures that the ground speed calculation is based on the actual size of wheel fitted to the harvester.

If the radius of more than one driven wheel is measured by the system 20, an average of the measured wheel radii may be used for the ground speed calculation. Alternatively, wheel radial data from only one of the measured wheels can be used. A measured radius of a non-driven wheel or wheels could alternatively be used provided the non-driven wheel is ostensibly the same size as the driven wheels or an offset used if there is a difference between the sizes of the driven and non-driven wheels.

As noted above with reference to FIG. 6, the system 20 is capable of detecting tire wear over time. In an embodiment, the controller 26 is configured to monitor the tire wear by analyzing the minimum distance $D_{min}$, measured in the absolute mode and/or the tread depth TD measured in the relative mode. Typically, the system 20 will be calibrated or set to a zero (i.e., no wear) setting when a new tire 24 is fitted. This might be achieved by taking initial reference measurements of the minimum distance $D_{min}$, and tread depth TD from the new tire 24. The system 20, especially the controller 26, monitors subsequent changes in minimum distance $D_{min}$, and tread depth TD over time to provide data relating to tire wear and/or condition. In a simple embodiment, the controller 26 is configured to issue a warning that a change of tire is approaching when the minimum distance $D_{min}$, and/or the trade depth TD reaches a pre-determined value as indicated at A in FIG. 6. A further warning may be issued that the tire must be changed when the minimum distance $D_{min}$, and/or the trade depth TD reaches a second pre-determined value as indicated at B in FIG. 6. However, in a more sophisticated embodiment, the controller 26 records data relating to tire wear over time and is configured to present information regarding the tire wear status via the HMI 28, such as when requested by an operator input, or which is issued remotely, such as via ACM (telemetry), to enable predictive maintenance of the tires 24. Information regarding tire condition status may be forwarded remotely to a dealer, for example. In an embodiment, the controller 26 is configured to map tire wear over the lifecycle of a tire 24 by logging the changes in the minimum distance $D_{min}$ and/or tread depth TD.

In an embodiment, the controller 26 also receives data relating to ground speed, which may be provided by a speed sensor of the machine; and/or engine use (elapsed engine hours), which may be provided by engine control system of the harvester.

In an embodiment, the controller 26 is configured to combine the distance information provided from the sensors 22 with the ground speed data and/or the engine usage data to enable the tire wear to be logged relative to usage of the harvester. It will be appreciated that the system can be configured to record tire wear data in a range of different ways which can be configured to enable the system to provided tire wear data in a range of different formats.

In the embodiment illustrated in FIG. 1, a tire wear sensor 22 is provided for each of the wheels 24. However, the system 20 could be limited to only one or some of the wheels 24. For example, the system may be arranged to only measure the radius of one or some of the front wheels 24.

It should also be appreciated that the system 20 can be adapted for use on machines having single wheels on the front axle.

Measurements of wheel radius may be carried out by the system on a periodic basis and may be made when the vehicle is stationary (in absolute mode at least) or travelling at relatively slow speeds to minimize the effect of tire deformation/suspension movement. Alternatively, readings from the distance sensors may be averaged over time or otherwise processed to eliminate the effect of tire deformation and/or suspension movement to provide results that are sufficiently accurate. Furthermore, measurements taken in relative mode can be used to correct for tire deformation and/or suspension movement.

Various modifications to the system and methods for determining the radius of a wheel on a mobile machine according to the disclosure will be apparent to those skilled in the art, without departing from the scope of the disclosure.

All references cited herein are incorporated herein in their entireties. If there is a conflict between definitions herein and in an incorporated reference, the definition herein shall control.

What is claimed is:

1. A combine harvester, comprising:
an axle supporting a wheel having a radius;
a height-adjustment system for adjusting a height of the axle;
a distance sensor mounted to the combine harvester and configured to detect distance information relating to a distance between a known datum and an outer circumferential surface of the wheel; and
at least one controller configured to receive the distance information from the distance sensor, to determine the radius of the wheel based at least in part on the distance information, and to use the determined wheel radius as an input to adjust the height of the axle.

2. The combine harvester of claim 1, wherein the distance sensor comprises a sensor selected from the group consisting of an ultrasonic sensor and a laser sensor.

3. The combine harvester of claim 1, wherein the distance sensor is configured to detect the distance information between the sensor and the wheel within ±2 mm.

4. The combine harvester of claim 3, wherein the distance sensor is configured to detect the distance information between the sensor and the wheel within ±1 mm.

5. The combine harvester of claim 1, wherein the distance sensor is mounted to the combine harvester at a known distance from an axis of rotation of the wheel.

6. The combine harvester of claim 1, wherein the wheel has a tire and the outer circumferential surface of the wheel is defined by an outer circumferential surface of the tire.

7. The system of claim 6, wherein the outer circumferential surface of the tire defines a tread comprising a plurality of tread features arranged in a pattern and separated by grooves, and wherein the at least one controller is configured to determine the distance between the distance sensor and the outer circumferential surface of the tire in at least one of the following two measurement modes:
an absolute mode in which a minimum distance ($D_{min}$) between the distance sensor and the tire is measured at outer surfaces of the tread features; and
a relative mode in which differences between the minimum distance ($D_{min}$) between the distance sensor and the tire measured at outer surfaces of the tread features and a maximum distance ($D_{max}$) measured at a bottom of the grooves as the wheel rotates is used to determine a depth of the tread (TO).

8. The combine harvester of claim 7, wherein the at least one controller is configured to determine the radius of the wheel using the absolute mode.

9. The combine harvester of claim 1, wherein the at least one controller is configured to compare radius determined by the at least one controller with data for a range of standard wheel sizes and to determine which standard wheel size the wheel conforms to.

10. A method of operating a combine harvester having at least one axle, the method comprising:
using a distance sensor mounted to the combine harvester to provide distance information to at least one controller, the distance information relating to a distance between a known datum and an outer circumferential surface of a wheel carried by the at least one axle of the combine harvester;
using the at least one controller to determine a radius of the wheel based at least in part on the distance information; and
using the determined wheel radius to adjust a height of the at least one axle.

11. The method of claim 10, further comprising mounting the sensor to the combine harvester at a known distance from an axis of rotation of the wheel.

12. The method of claim 10, further comprising comparing the radius of the wheel with data for a range of standard wheel sizes and determining from the comparison which standard wheel size the wheel conforms to.

13. The method of claim 10, wherein the wheel has a tire, and wherein the method comprises using the distance sensor to provide the distance information relating to a distance between the known datum and an outer circumferential surface of the tire.

14. The method of claim 13, wherein the outer circumferential surface of the tire defines a tread comprising a plurality of tread features arranged in a pattern and separated by grooves, the method further comprising determining the distance between the sensor and the outer circumferential surface of the tire in at least one of the following two measurement modes:
an absolute mode in which a minimum distance ($D_{min}$) between the sensor and the tire is measured at the outer surfaces of the tread features; and
a relative mode in which differences between the minimum distance ($D_{min}$) between the sensor and the tire measured at the outer surfaces of the tread features and a maximum distance ($D_{max}$) measured at the bottom of the grooves as the wheel rotates is used to determine the depth of the tread (TD).

15. The method of claim 10, further comprising determining a radius of more than one wheel of the combine harvester using a respective distance senor for each wheel to be measured.

* * * * *